United States Patent [19]

Adnet

[11] Patent Number: 5,673,267

[45] Date of Patent: Sep. 30, 1997

[54] METHOD OF ALLOCATING CARRIER FREQUENCIES FOR SIMULTANEOUS TRANSMISSION OF A PLURALITY OF MODULATED SIGNALS ESPECIALLY ON AN OPTICAL LINK

[75] Inventor: Lionel Adnet, Brussels, Belgium

[73] Assignee: Alcatel Cit, Paris, France

[21] Appl. No.: 70,872

[22] Filed: Jun. 3, 1993

[30] Foreign Application Priority Data

Jun. 4, 1992 [FR] France ................... 92 06799

[51] Int. Cl.$^6$ ................................................. H04J 1/00
[52] U.S. Cl. ................................................. 370/480
[58] Field of Search ........................ 370/69.1, 120,
370/121, 123, 71, 73, 480, 482; 375/38,
60, 61; 455/108, 109, 103, 17, 6.1, 45,
57.1, 59; 332/170

[56] References Cited

U.S. PATENT DOCUMENTS

| | | | |
|---|---|---|---|
| 4,641,318 | 2/1987 | Addeo | 375/38 |
| 4,757,495 | 7/1988 | Decker et al. | 370/69.1 |
| 4,768,187 | 8/1988 | Marshall | 370/69.1 |
| 4,787,094 | 11/1988 | Eguchi | 375/60 |
| 4,953,156 | 8/1990 | Olshansky et al. | 359/132 |
| 5,107,360 | 4/1992 | Huber | 359/124 |
| 5,170,413 | 12/1992 | Hess et al. | 370/69.1 |

OTHER PUBLICATIONS

"Digital and analog communication systems" by Sam Shanmugam, 1979 pp. 297-299.

Electronics Letters, vol. 27, No. 7, Mar. 28, 1991, Stevenage, Great Britain, pp. 600-601, Lee et al: "Uniform CNR design rules for coherent subcarrier multiplexed system with multioctave frequency allocation".

*Primary Examiner*—Douglas W. Olms
*Assistant Examiner*—Ajit Patel
*Attorney, Agent, or Firm*—Sughrue, Mion, Zinn, Macpeak & Seas

[57] ABSTRACT

In a method of allocating carrier frequencies for simultaneous transmission of a plurality of modulated signals the carrier frequencies are chosen to satisfy the equation:

$$f=(2p+1)n\pm k$$

where "p" is an integer number specific to each carrier frequency, "n" represents a given frequency bandwidth and "k" represents a given frequency bandwidth less than "n" and possibly a null bandwidth. The value of n is chosen to be sufficiently large relative to the width of the frequency channels occupied by the modulated signals that if $k\neq 0$ second order composite distortion occurs outside the channels. Alternatively, if n is insufficiently large relative to the width of the channels (or the widest of them if the channels are not all the same width) the capacity of the transmission system is such that second order composite distortion occurring inside the channels is offset sufficiently relatively to the carrier frequency not to disrupt the transmission of the respective signals.

6 Claims, 3 Drawing Sheets

METHOD OF ALLOCATING CARRIER FREQUENCIES FOR SIMULTANEOUS TRANSMISSION OF A PLURALITY OF MODULATED SIGNALS ESPECIALLY ON AN OPTICAL LINK

BACKGROUND OF THE INVENTION

1. Field of the invention

The present invention concerns a method of allocating carrier frequencies for simultaneous transmission of a plurality of modulated signals especially on an optical link.

The present invention is particularly suitable for transmission systems, especially optical transmission systems, in which non-linear operation causes composite beat frequencies which can disrupt the transmission of said modulated signals because of their location relative to the frequency channels occupied by said signals.

The invention is more particularly suited to optical transmission systems in which non-linear operation results from the use of a direct modulation optical source whose wavelength is compatible with doped fiber optical amplification such as a distributed feedback (DFB) semiconductor laser, such direct modulation causing the wavelength of the source to fluctuate in proportion to the applied modulation (this phenomenon is known as "chirp"), and from the use of an optical fiber subject to chromatic dispersion causing propagation time distortion as a function of frequency in the resulting frequency band.

2. Description of the prior art

Various solutions have been proposed to the problems associated with these composite beat frequencies, the amplitude of which is directly proportional to the length of the optical link.

One solution is to use shifted optical fiber as the transmission medium in order to neutralize chromatic dispersion.

A solution of this kind is described in the following documents, for example:

Dispersion induced Composite Second Order Distortion at 1.55 μm (Bergmann/Kuo/Huang) (ATT Bell Laboratories) IEEE Photonics Letters, Volume 3, n° 1, January 91.

Impact of dispersion on analog video transmission (Williamson—American Television and Communications Corporation—and Wolfe—Corning Inc.) NCTA Technical Papers, 1991 page 20.

A drawback of a solution of this kind is that it is not economic because this type of fiber is more difficult to manufacture and therefore more costly.

A second solution is to compensate these phenomena electrically using a non-linear circuit. A solution of this kind is described in the following documents, for example:

Impact of dispersion on analog video transmission (Williamson—American Television and Communications Corporation—and Wolfe—Corning Inc.) NCTA Technical Papers, 1991 page 20.

Electrical predistortion to compensate for combined effect of laser chirp and fiber dispersion (Gysel/Ramachandran) (Synchronous Communications Corp.). Electronics Letters, February 1991, volume 27, n° 5, page 421.

The feasibility of such correction is as yet doubtful, however, particularly in the UHF band up to 860 MHz.

SUMMARY OF THE INVENTION

An object of the invention is to solve problems associated with generation of composite beat frequencies, especially second order beat frequencies, equal to the sum or the difference of two carrier frequencies, the solution of the invention differing from those summarized above and being free of their drawbacks.

The present invention applies in particular to video cable networks in which the modulated signals are television signals transmitted using vestigial sideband amplitude modulation and where the allocation of carrier frequencies is governed by national and international standards.

The present invention consists in a method of allocating carrier frequencies for simultaneous transmission of a plurality of modulated signals wherein said carrier frequencies are chosen to satisfy the equation:

$$f=(2p+1)n\pm k$$

where p is an integer number specific to each carrier frequency, n represents a given frequency bandwidth and k represents a given frequency bandwidth less than "$\underline{n}$" and possibly a null bandwidth, and either $\underline{n}$ is chosen sufficiently large relative to the width of the frequency channels occupied by said modulated signals that, if k≠0 second order composite distortion occurs outside said channels, or, if n is insufficiently large relative to the width of said channels or the widest of them if said channels are not all of the same width, the capacity of the transmission system is such that second order composite distortion occurring inside said channels is offset sufficiently relative to the carrier frequency not to disrupt the transmission of the respective signals.

According to another feature of the invention the frequency band including said carrier frequencies is divided into a lower band and an upper band and said carrier frequencies in one band are chosen to satisfy the equation:

$$f=(2p+1)n\pm k$$

where k≠0 and said carrier frequencies in the other of said bands are chosen to satisfy the equation:

$$f=(2p+1)n$$

in order to reduce or eliminate any disturbances due to second order composite distortion without it being necessary to consider either the ratio of the bandwidth $\underline{n}$ and the width of said channels or the capacity of the transmission system.

Other objects and features of the present invention will emerge from the following description of embodiments of the invention given with reference to the appended drawings.

DETAILED DESCRIPTION OF THE INVENTION

The invention will be specifically described hereinafter in the context of its application to video cable networks where carrier frequency allocation is subject to two kinds of standards.

Under a first kind of standard (in force in Europe) the frequency band including the allocatable carrier frequencies is divided into a lower band in the VHF band and an upper band in the UHF band. The frequencies that can be allocated in the UHF band run from 471.25 MHz through 839.25 MHz in steps of 8 MHz. The frequencies that can be allocated in the VHF band run in France from 120 MHz through 288 MHz in steps of 8 MHz and in countries other than France from 303.25 MHz through 455.25 MHz in steps of 8 MHz.

Under a second kind of standard (in force in North America and Japan) the frequency band including the allocatable carrier frequencies is in the VHF band and the allocatable frequencies run from 55.25 MHz through 643.25 MHz in steps of 6 MHz.

The first kind of standard covers B, G, H and I standard systems in European countries other than France and the L standard system in France.

The second kind of standard covers M standard systems.

Figure 1:
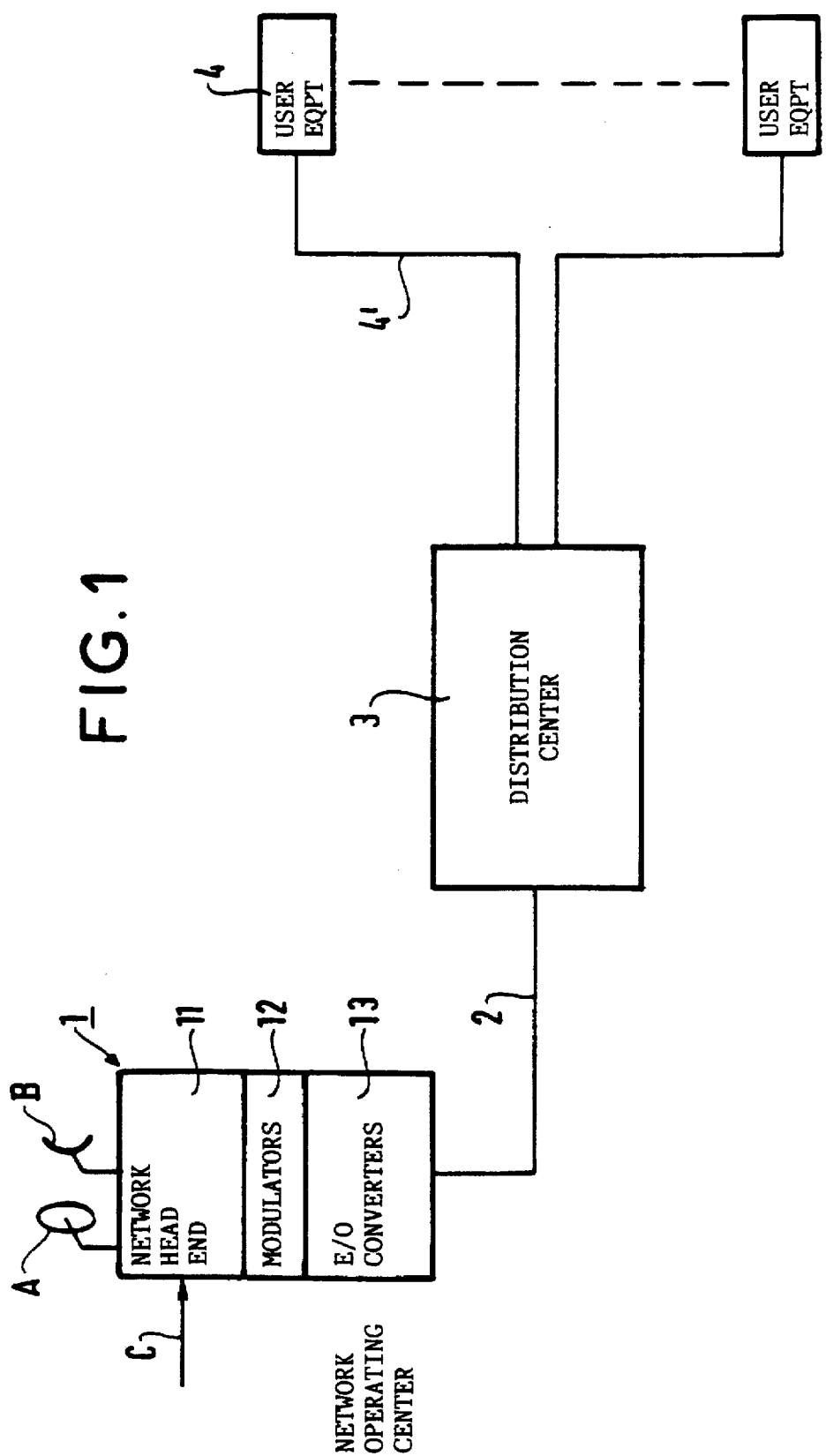
FIG. 1 is a block diagram of a video cable network showing one application of the present invention.

FIG. 1 is a diagrammatic representation of a video cable network to which the present invention may be applied.

FIG. 1 shows a network operating center 1 comprising:
- a network head end 11 which can receive television programs from a satellite (A), over a microwave link (B) or via a digital highway (C) and which demodulates the signals received in the base band,
- modulation equipment 12 providing modulated signals by modulating various carriers using the various base band signals obtained, and
- electrical-to-optical conversion equipment 13 for converting electrical signals obtained at the output of the modulation equipment 12 into optical signals and amplifying the resulting optical signals by means of one or more doped fiber optical amplifiers.

The optical signals obtained at the output of the operating center 1 are routed over transport optical links 2 (only one of which is shown in FIG. 1) to distribution centers 3 (only one of which is shown in FIG. 1).

The distribution center 3 distributes the optical signals received from the operating center to N user equipments 4 over N distribution optical links 4' forming a distribution network. The distribution center also amplifies the optical signals received and sent.

Figure 2:
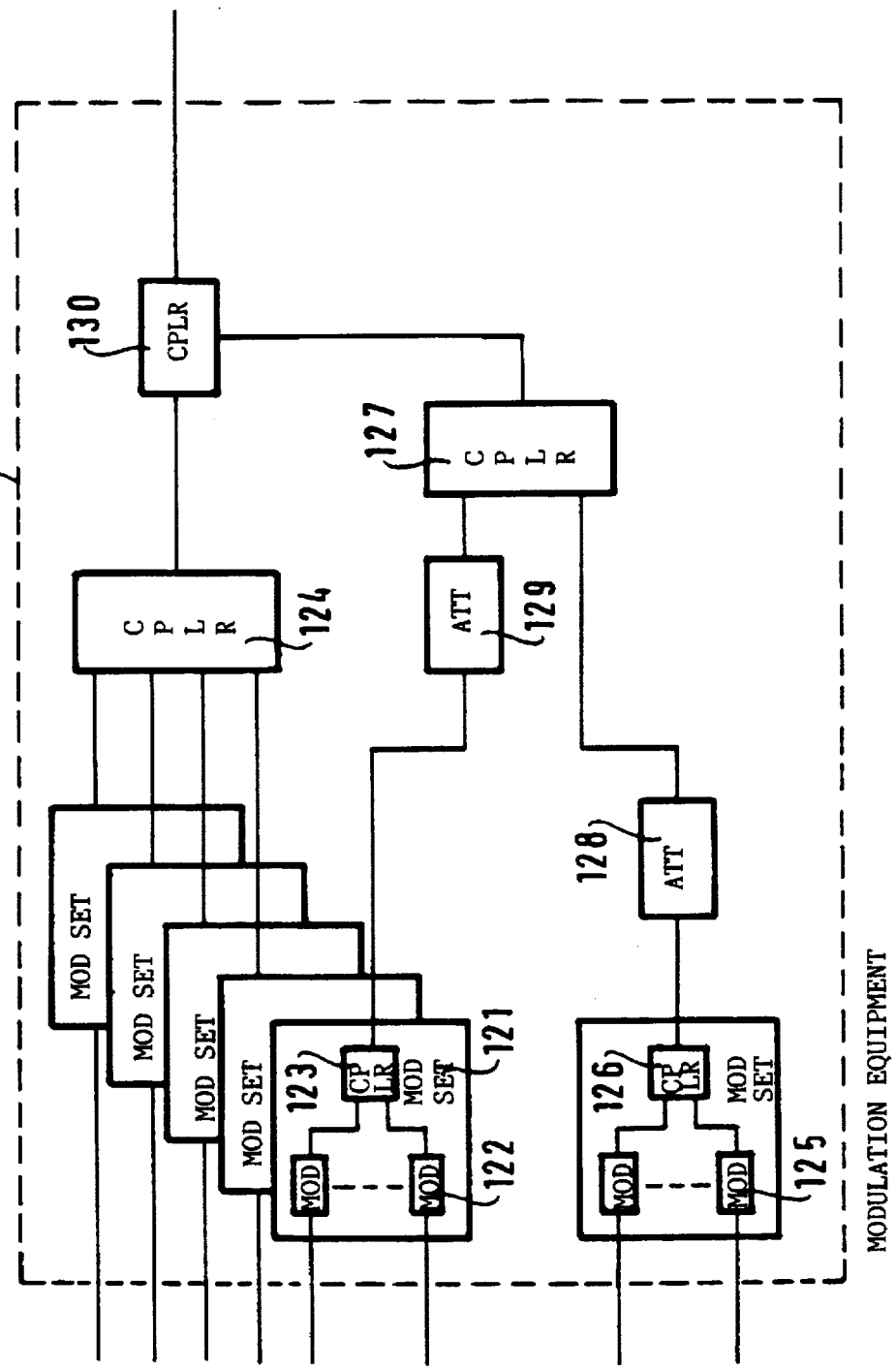
FIG. 2 is a block diagram of the modulation equipment used in a network of the type shown in FIG. 1 to generate modulated signals transmitted over the network.

The modulation equipment 12 shown in FIG. 2 essentially comprises a battery of modulators (the number of modulators is equal to the maximum number of television channels that can be transmitted over the network) the outputs of which are connected to a common coaxial line via coupling means. This equipment comprises:
- a first battery of up to 40 modulators dedicated to TV programs and organized into five sets 121 each of eight modulators 122 the outputs of which are coupled to a common coaxial line through a coupler 123, the outputs of four sets 121 being coupled to a common coaxial line by a coupler 124, and
- a second battery of up to 30 modulators dedicated to high fidelity programs and comprising a set of 30 modulators 125 whose outputs are coupled to a common coaxial line by a coupler 126.

The output of the coupler 126 and the output of that of the five sets 121 which is not connected to the coupler 124 are coupled to a common coaxial line by a coupler 127 via respective attenuators 128 and 129.

The outputs of the couplers 124 and 127 are coupled to a common coaxial line by a coupler 130 whose output constitutes the output of the modulation equipment.

The basic idea for a process of allocating carrier frequencies without regard to second order composite beat frequencies for television channels with a nominal bandwidth of n MHz is to allocate to those channels carrier frequencies which are odd multiples of n MHz.

The carrier frequencies are then defined by the equation:

$$f(MHz)=(2p+1)\times n$$

where p is an integer.

Any two carrier frequencies defined in this way produce second order composite distortion at a frequency $2q \times n$ MHz (where q is an integer, i.e. at an even multiple of n MHz) offset by +n MHz relative to the carrier frequency $(2q-1) \times n$ MHz and by −n MHz relative to the carrier frequency $(2q+1) \times n$ MHz. The second order composite distortion therefore has no effect on these two n MHz channels.

Under the M standard the width "n" is 6 MHz and so in theory the carrier frequencies must be odd multiples of 6 MHz.

Under the B, G, H, I and L standards the nominal width "n" is 8 MHz in the UHF band and 8 or 12 MHz in the VHF band, depending on the type of television signal concerned. Thus in theory the carrier frequencies must be odd multiples of 8 MHz or 12 MHz. Carrier frequencies which are odd multiples of 8 MHz are advantageously chosen to eliminate the effect of second order composite distortion in the UHF band and to obtain the largest possible number of stable channels in the VHF band (it is possible to choose carrier frequencies that are odd multiples of 12 MHz but this yields a smaller number of usable channels and does not conform to the channel spacing of 8 MHz in the UHF band in force in Europe). Thus the 12 MHz UHF channels (for D2MAC type signals in the 16/9 format) affected by second order composite distortion are offset +8 MHz from the carrier frequency. However, this is compensated by the fact that in practise the protection required at the subscriber outlet of a video network under applicable standards for D2MAC 16/9 type signals is reduced as compared with the worst case scenario in which the second order composite distortion is offset 0 MHz from the carrier frequency (in practise 23 dB in the former case as compared with 56 dB in the latter case, a reduction of 33 dB).

In reality, to conform to the standards governing the allocation of carrier frequencies, as summarized above, frequencies must be allocated that are defined by the following equations:

$$f(MHz)=(2p+1)\times 8 - 0.75 \qquad (1)$$

$$f(MHz)=(2p+1)\times 6 - 1.25 \qquad (2)$$

The effect of this is merely to shift by −0.75 MHz (respectively +1.25 MHz) relative to 8 MHz (respectively 6 MHz) the offset between the second order composite beat frequencies of type F1+F2 and the channel picture carriers and by +0.75 MHz (respectively −1.25 MHz) relative to 8 MHz (respectively 6 MHz) the offset between second order composite beat frequencies of type F1–F2 and the channel picture carriers.

In M standard systems a channel for an NTSC type television signal occupies a band only from −0.75 MHz to +4.2 MHz relative to the picture carrier and the sound carrier is 4.5 MHz away from the picture carrier and is frequency modulated with a frequency excursion of ±0.025 MHz. Accordingly, second order composite distortion +6−1.25=+4.75 MHz from the picture carrier of channel (2q−1) or −6−1.25=−7.25 MHz from the picture carrier of channel (2q+1) has no effect on either channel. Second order composite distortion +6+1.25=+7.25 MHz from the picture carrier of channel (2q−1) or −6+1.25=−4.75 MHz from the picture carrier of channel (2q+1) has no effect on either channel.

Equation (2) above thus defines a frequency plan suitable for M standard systems.

A D2MAC 4/3 type television signal occupies a band from only −1.25 MHz to +6.5 MHz relative to the picture carrier and a B, G, H or I standard channel (worst case scenario for the I standard) occupies a band of only −1.25 MHz to +5.5 MHz relative to the picture carrier and the sound carrier is +6 MHz away from the picture carrier (worst case scenario for the I standard) and is frequency modulated with a frequency excursion of ±0.050 MHz. Accordingly, second order composite distortion +8−0.75=+7.25 MHz from the picture carrier of channel (2q−1) or −8−0.75=−8.75 MHz from the picture carrier of channel (2q+1) has no effect on either channel. Second order composite distortion +8+0.75=+8.75 MHz from the picture carrier of channel (2q−1) or −8+0.75=−7.25 MHz from the picture carrier of channel (2q+1) has no effect on either channel.

Only second order composite distortion +7.25 MHz or +8.75 MHz from the carrier frequency on 12 MHz VHF channels for D2MAC 16/9 type signals requires consideration. However, the protection required at the subscriber outlet under applicable standards for D2MAC 16/9 channels +7.25 MHz from the carrier (respectively +8.75 MHz from the carrier) is 27 dB (respectively 13 dB), a reduction of 29 dB (respectively 43 dB) relative to the worst case scenario (56 dB) in which the composite distortion occurs at an offset of 0 MHz from the carrier frequency.

Equation (1) above thus defines a frequency plan suitable for B, G, H and I standard systems.

In L standard systems the protection required at the subscriber outlet under applicable standards 7.25 MHz from the carrier frequency is 34 dB. There is therefore in this case an additional constraint as to second order composite beat frequencies for 8 MHz channels.

Consideration of the origin of second order composite distortion occurring in the UHF channels +7.25 MHz from the carrier frequency shows that it is due entirely to combinations of the type $F1_{VHF}+F2_{UHF}$ or $F1_{VHF}+F2_{VHF}$.

To circumvent this additional constraint the principle described above for B, G, H and I standard systems is adopted for frequency allocation in the UHF band, namely:

$$f_{UHF}(\text{MHz})=(2p+1)\times 8-0.75 \qquad (3)$$

and the frequencies allocated in the VHF band are offset by +0.75 MHz to obtain the generic formula:

$$f_{VHF}(\text{MHz})=(2p+1)\times 8 \qquad (4)$$

The $F1_{VHF}+F2_{UHF}$ type beat frequencies are equal to:

$$(2m+1)\times 8-0.75+(2p+1)\times 8=2q\times 8-0.75 \text{ MHz}$$

with q=m+p+1. They are offset by +8 MHz relative to the UHF carrier frequency (2q−1)×8−0.75 MHz and by −8 MHz relative to the UHF carrier frequency (2q+1)×8−0.75 MHz. They have no effect on these two 8 MHz channels even if they are SECAM or D2MAC 4/3 type UHF channels.

The $F1_{VHF}+F2_{VHF}$ beat frequencies are equal to:

$$(2m+1)\times 8+(2p+1)\times 8=2q\times 8=(2q-1)\times 8-0.75+8.75 \text{ MHz}$$

where q=m+p+1. They are offset by +8.75 MHz relative to the UHF carrier frequency (2q+1)×n−0.75 MHz and they have no effect on these two 8 MHz channels even if they are SECAM or D2MAC 4/3 type channels.

The $F1_{UHF}-F2_{VHF}$ type beat frequencies are equal to:

$$(2m+1)\times 8-0.75-(2p+1)\times 8=2q\times 8-0.75 \text{ MHz}$$

with q=m+p. They are offset by +8 MHz relative to the UHF carrier frequency (2q−1)×8−0.75 MHz and by −8 MHz relative to the UHF carrier frequency (2q+1)×8−0.75 MHz and have no effect on these two 8 MHz channels even if they are SECAM or D2MAC 4/3 type channels.

The $F1_{UHF}\pm F2_{UHF}$ combinations do not cause second order composite distortion in the UHF band used.

By using for allocation of carrier frequencies in the VHF band the equation f(MHz)=(2p+1)×8 MHz the constraint on second order composite distortion for 8 MHz UHF channels to the L standard is totally eliminated.

Consideration of second order distortion occurring in the VHF band shows that only $F1_{VHF}\pm F2_{VHF}$, $F1_{UHF}-F2_{UHF}$ and $F1_{UHF}-F2_{VHF}$ distortion require consideration.

The $F1_{VHF}\pm F2_{VHF}$ type beat frequencies are equal to:

$$(2m+1)\times 8\pm(2p+1)\times 8=2q\times 8 \text{ MHz}$$

where q=m+p+1 or m−p. They are offset by +8 MHz relative to the VHF carrier frequency (2q−1)×8 MHz and by −8 MHz relative to the VHF carrier frequency (2q+1)×8 MHz and they have no effect on these two channels in the case of SECAM or D2MAC 4/3 type channels. Consideration is required only as to the effect of second order composite distortion +8 MHz from the carrier frequency on 12 MHz VHF channels for D2MAC 16/9 signals. However, the protection required at the subscriber outlet for D2MAC 16/9 channels +8 MHz from the carrier is 23 dB which represents a reduction of 33 dB relative to the worst case scenario (56 dB) in which the second order composite distortion occurs at an offset of 0 MHz relative to the carrier frequency.

The $F1_{UHF}-F2_{UHF}$ type beat frequencies are equal to:

$$(2m+1)\times 8-0.75-((2p+1)\times 8-0.75)=2q\times 8 \text{ MHz}$$

where q=m−p. They are offset by +8 MHz relative to the VHF carrier frequency (2q−1)×8 MHz and by −8 MHz relative to the VHF carrier frequency (2q+1)×8 MHz and they have no effect on these two channels in the case of SECAM or D2MAC 4/3 type channels. Consideration is required only as to the effect of second order composite distortion +8 MHz from the carrier frequency on 12 MHz D2MAC 16/9 VHF channels. However, the protection required at the subscriber outlet for D2MAC 16/9 channels +8 MHz from the carrier is 23 dB which represents a reduction of 33 dB relative to the worst case scenario (56 dB) in which the second order composite distortion occurs at an offset of 0 MHz relative to the carrier frequency.

The $F1_{UHF}-F2_{VHF}$ type beat frequencies are equal to:

$$(2m+1)\times 8-0.75-(2p+1)\times 8=(2q-1)\times 8+8-0.75 \text{ MHz}$$

where q=m−p. They are offset by +7.25 MHz relative to the VHF carrier frequency (2q−1)×8 MHz and by −8.75 MHz relative to the VHF carrier frequency (2q+1)×8 MHz and they have no effect on these two channels in the case of D2MAC 4/3 type channels. Consideration is required only as to the effect of second order composite distortion +7.25 MHz from the carrier frequency on 8 MHz or 12 MHz VHF channels for SECAM or D2MAC 16/9 type signals. However, the protection required at the subscriber outlet under applicable standards for SECAM (respectively D2MAC 16/9) channels +7.25 MHz from the carrier is 34 dB (respectively 27 dB) which represents a reduction of 22 dB (respectively 29 dB) relative to the worst case scenario (56 dB) in which the second order composite distortion occurs at an offset of 0.5 to 1 MHz (respectively 0 MHz) relative to the carrier frequency.

Equations (3) and (4) above therefore define a frequency plan suitable for L standard systems.

Figure 3:
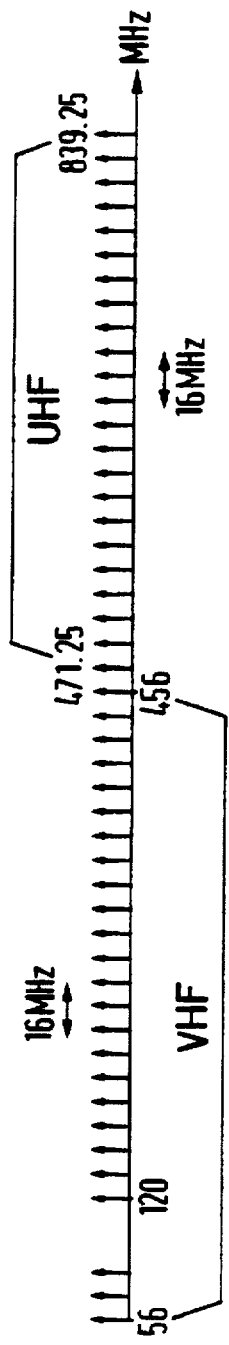
FIG. 3 is a diagram showing a typical frequency plan obtained by application of the present invention and usable when the modulated signals are television signals transmitted by vestigial sideband amplitude modulation and the frequency allocation must conform to the L standard.

As shown in FIG. 3 by way of example the following could be selected for L standard systems:

24 UHF carrier frequencies from 471.25 MHz to 839.25 MHz in 16 MHz steps,

24 VHF carrier frequencies in the 47–470 MHz band, avoiding the FM band, for example the following frequencies:

56 MHz, 72 MHz, 120 MHz to 456 MHz in 16 MHz steps.

Figure 4:
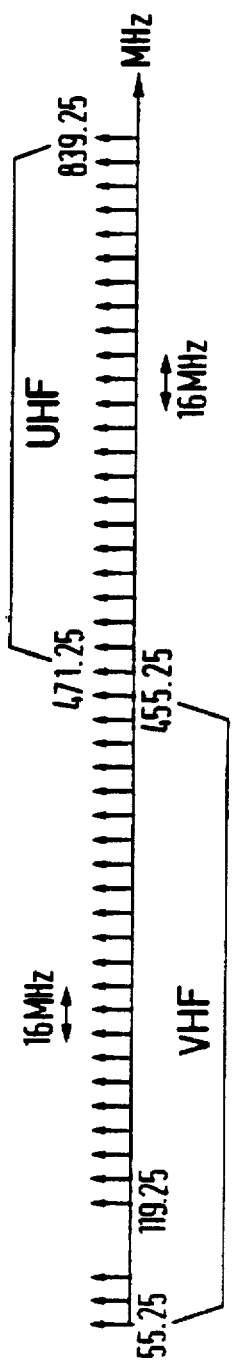
FIG. 4 is a diagram showing a typical frequency plan obtained by application of the present invention and usable when the modulated signals are television signals transmitted by vestigial sideband amplitude modulation and the frequency allocation must conform to the B, G, H, I standard.

As shown in FIG. 4 by way of example the following could be selected for B, G, H, I standard systems:

24 UHF carrier frequencies from 471.25 MHz to 839.25 MHz in 16 MHz steps,

24 VHF carrier frequencies chosen in the 47–470 MHz band, avoiding the FM band, for example the following frequencies:

55.25 MHz, 71.25 MHz, 119.25 MHz to 455.25 MHz in 16 MHz steps.

Figure 5:
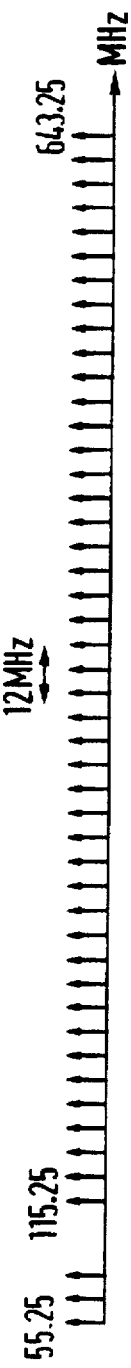
FIG. 5 is a diagram showing a typical frequency plan obtained by application of the present invention and usable when the modulated signals are television signals transmitted by vestigial sideband amplitude modulation and the frequency allocation must conform to the M standard.

As shown in FIG. 5 by way of example 48 carrier frequencies could be chosen for M standard systems, as follows:

55.25 MHz, 67.25 MHz, 79.25 MHz, 115.25 MHz to 643.25 MHz in 12 MHz steps.

The resulting frequency plan for an M standard system avoids all constraints associated with second order composite distortion.

There remain in the resulting frequency plans for B, G, H, I and L standard systems only constraints in respect of the VHF channels.

It can be shown that for a dispersive transmission distance of up to 30 km these constraints relating to second order composite distortion for VHF channels in these frequency plans are always satisfied for lasers where the "chirp" (wavelength fluctuation as a function of applied modulation) is less than 1200 MHz/mW coupled into the fiber.

The contribution of this laser "chirp" (or fluctuation) and the fiber dispersion in terms of second order composite distortion may be calculated from the following formula:

$$m^2.N.(Po.C.L.D.2\pi F.(\lambda^2/c))^2$$

where:

N is the number of F1±F2 type beat frequencies causing the second order composite distortion at the frequency F, m is the modulation index of the laser for each TV channel, Po is the laser power in mW coupled into the fiber, C is the fluctuation in MHz/mW in the laser wavelength as a function of the modulation applied at the modulating frequency F coupled into the fiber, F is the frequency in MHz of the second order composite distortion, D is the chromatic dispersion in ps/(nm.km) of the fiber at the wavelength in question, L is the transmission distance in km, $\lambda$ is the wavelength in nm and $\underline{c}$ is the speed of light in nm/s.

It can be shown that the worst case scenarios for these constraints associated with second order composite distortion for VHF channels are:

for the frequency plan defined above for the B, G, H, I systems F=464 MHz where the N.F$^2$ product is maximum with N=19 for F1–F2 beat frequencies and where the protection required is 13 dB; F=462.5 MHz where the product N.F$^2$ is maximum with N=10.25 for the F1+F2 beat frequencies and where the protection required is 27 dB;

for the frequency plan defined above for the L system, F=463.25 MHz where the product N.F$^2$ is maximum with N=10 and where the protection required is 34 dB.

It is this latter case which represents the greatest constraint.

For a maximum modulation index m of 6.5% for 40 to 45 channels directly modulating a distributed feedback (DFB) laser, with N=19, Po=P$_o$maximum=3 mW, $\lambda$=1 550 nm, D=19 ps/nm.km, c=3.10$^{17}$ nm/s, C.L=36 500 km.MHz/mW, the worst case scenario gives a −38 dB laser "chirp" (wavelength fluctuation)+fiber dispersion contribution to second order composite distortion.

The protection required at the subscriber outlet being 34 dB for this worst case scenario, it is seen that if all other second order non-linearities of the system (optical sender, amplifiers, optical receiver) do not contribute more than 45 dB (for example) of second order composite distortion there will remain at least 37 dB of protection at the user outlet. A second order composite distortion contribution of 45 dB is well below what can be achieved in the present state of the art.

The only applicable condition therefore concerns the product of laser "chirp" (wavelength fluctuation) and transmission distance. For example, for lasers having a fluctuation of less than 1 200 MHz/mW coupled into the fiber transmission distances up to 30 km can be achieved.

Although the foregoing description has been given by way of specific example with reference to video cable networks in which said modulated signals are television signals transmitted by vestigial sideband amplitude modulation, in respect of which carrier frequency allocation is subject to standards, it will be understood that the invention is not limited to an application of this kind.

There is claimed:

1. A method of allocating a plurality of carrier frequencies for simultaneous transmission of a plurality of modulated signals over a plurality of frequency channels in a transmission system, wherein said frequencies are chosen to satisfy the equation:

$$f=(2p+1)n\pm k$$

where:

p is an integer number specific to each carrier frequency;

n represents a fixed frequency bandwidth, and either n is greater than a frequency bandwidth of the frequency channels occupied by said modulated signals if said frequency channels are all of the same width, or is greater than the frequency bandwidth of a widest one of said frequency channels if said frequency channels are not all of the same width; and k represents a given frequency bandwidth less than n and is greater than or equal to a null bandwidth.

2. The method according to claim 1 wherein a frequency band including said carrier frequencies is divided into a lower band and an upper band, and said carrier frequencies in one of said lower and upper bands are chosen to satisfy the equation:

$$f=([w]2p+1)n\pm k$$

where $k \neq 0$
and said carrier frequencies in the other of said upper and lower bands are chosen to satisfy the equation:

$$f=(2p+1)n$$

in order to reduce or eliminate any disturbances due to second order composite distortion without it being necessary to consider either the ratio of the bandwidth n and the width of said channels or the capacity of the transmission system.

3. A method of allocating a plurality of carrier frequencies for simultaneous transmission of a plurality of modulated signals over a plurality of frequency channels in a transmission system, wherein said frequencies are chosen to satisfy the equation:

$$f=(2p+1)n\pm k$$

where:
- p is an integer number specific to each carrier frequency;
- n represents a fixed frequency bandwidth, and either n is greater than a frequency bandwidth of the frequency channels occupied by said modulated signals if said frequency channels are all of the same width, or is greater than the frequency bandwidth of a widest one of said frequency channels if said frequency channels are not all of the same width; and
- k represents a given frequency bandwidth less than n and is greater than or equal to a null bandwidth; and
- wherein said modulated signals are television signals transmitted by vestigial sideband amplitude modulation, and wherein said frequency allocation conforms to the B, G, H and I standards and the allocated frequencies comprise frequencies in the UHF band from 471.25 MHz to 839.25 MHz in 16 MHz steps and frequencies in the VHF band of 55.25 MHz, 71.25 MHz and from 119.25 MHz to 455.25 MHz in 16 MHz steps.

4. A method of allocating a plurality of carrier frequencies for simultaneous transmission of a plurality of modulated signals over a plurality of frequency channels in a transmission system, wherein said frequencies are chosen to satisfy the equation:

$$f=(2p+1)n\pm k$$

where:
- p is an integer number specific to each carrier frequency;
- n represents a fixed frequency bandwidth, and either n is greater than a frequency bandwidth of the frequency channels occupied by said modulated signals if said frequency channels are all of the same width, or is greater than the frequency bandwidth of a widest one of said frequency channels if said frequency channels are not all of the same width; and
- k represents a given frequency bandwidth less than n and is greater than or equal to a null bandwidth;
- wherein a frequency band including said carrier frequencies is divided into a lower band and an upper band;
- wherein said carrier frequencies in one of said lower and upper bands are chosen with $k \neq 0$ and said carrier frequencies in the other of said upper and lower bands are chosen with k=0 so that any disturbances due to second order composite distortion are reduced without consideration of the ratio of the bandwidth n to the width of said channels, and of the capacity of the transmission system; and
- wherein said modulated signals are television signals transmitted by vestigial sideband amplitude modulation, said frequency allocation conforms to the L standard, and the frequencies allocated comprise frequencies in the UHF band from 471.25 MHz to 839.25 MHz in 16 MHz steps and frequencies in the VHF band of 56 MHz, 72 MHz and from 120 MHz to 456 MHz in 16 MHz steps.

5. A method of allocating a plurality of carrier frequencies for simultaneous transmission of a plurality of modulated signals over a plurality of frequency channels in a transmission system, wherein said frequencies are chosen to satisfy the equation:

$$f=(2p+1)n\pm k$$

where:
- p is an integer number specific to each carrier frequency;
- n represents a fixed frequency bandwidth, and either n is greater than a frequency bandwidth of the frequency channels occupied by said modulated signals if said frequency channels are all of the same width, or is greater than the frequency bandwidth of a widest one of said frequency channels if said frequency channels are not all of the same width; and
- k represents a given frequency bandwidth less than n and is greater than or equal to a null bandwidth; and
- wherein said modulated signals are television signals transmitted by vestigial sideband amplitude modulation, said frequency allocation must conform to the M standard and the allocated frequencies comprise frequencies of 55.25 MHz, 67.25 MHz, 79.25 MHz and from 115.25 MHz to 643.25 MHz in 12 MHz steps.

6. A method of allocating carrier frequencies to frequency channels for simultaneous transmission of modulated signals in a transmission system, each of said frequency channels having a respective width, said method comprising the steps of:
- determining whether said frequency channels have an identical respective width;
- setting, when said frequency channels have said identical respective width, a value n of a fixed frequency bandwidth as being greater than said identical respective width;
- setting, when said frequency channels do not have said identical respective width, said value n of said fixed frequency bandwidth as being greater than said respective width of a widest one of said frequency channels;
- assigning to each of said carrier frequencies a respective integer number p;
- selecting a given frequency bandwidth k wherein $0 \leq k < n$; and allocating each frequency of said carrier frequencies so that $f=(2p+1)n\pm k$.

* * * * *